US006624107B2

(12) United States Patent
Wenzel et al.

(10) Patent No.: US 6,624,107 B2
(45) Date of Patent: Sep. 23, 2003

(54) TRANSITION METAL CATALYST COMPOUNDS HAVING DEUTERIUM SUBSTITUTED LIGAND AND CATALYST SYSTEMS THEREOF

(75) Inventors: Timothy T. Wenzel, Charleston, WV (US); Thomas Henry Peterson, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 89 days.

(21) Appl. No.: 10/033,994

(22) Filed: Dec. 20, 2001

(65) Prior Publication Data

US 2002/0123580 A1 Sep. 5, 2002

Related U.S. Application Data

(60) Continuation-in-part of application No. 09/864,571, filed on May 24, 2001, now Pat. No. 6,534,604, which is a division of application No. 09/425,387, filed on Oct. 22, 1999, now Pat. No. 6,274,684.

(51) Int. Cl.[7] .............................................. B01J 31/00
(52) U.S. Cl. ....................... 502/150; 502/167; 502/162; 526/127; 526/128; 526/129; 526/141; 526/142
(58) Field of Search .................................. 502/150, 167, 502/162; 526/128, 141, 142, 129, 127

(56) References Cited

U.S. PATENT DOCUMENTS

| | | | | |
|---|---|---|---|---|
| 4,057,565 | A | 11/1977 | Manzer | 260/429 |
| 5,426,243 | A | 6/1995 | Lecouve | 568/737 |
| 5,637,660 | A | 6/1997 | Nagy et al. | 526/160 |
| 5,707,913 | A | 1/1998 | Schlund et al. | 502/102 |
| 5,726,115 | A | 3/1998 | Horton et al. | 502/152 |
| 5,798,427 | A | 8/1998 | Foster et al. | 526/352 |
| 5,889,128 | A | 3/1999 | Schrock et al. | 526/107 |

FOREIGN PATENT DOCUMENTS

| | | |
|---|---|---|
| EP | 0197310 A3 | 10/1986 |
| EP | 0197310 A2 | 10/1986 |
| EP | 0241560 A1 | 10/1987 |
| EP | 0751142 A2 | 1/1997 |
| EP | 0816372 A1 | 1/1998 |
| EP | 0816384 A2 | 1/1998 |
| EP | 0816384 A3 | 1/1998 |
| EP | 0 874 005 A1 | 10/1998 |
| EP | 0803520 B1 | 12/1998 |
| EP | 0890575 A1 | 1/1999 |
| EP | 0 893 454 A1 | 1/1999 |
| JP | 02-78663 | 3/1990 |
| JP | 08-081415 | 7/1996 |
| JP | 08-277307 | 10/1996 |
| JP | 10-7712 | 1/1998 |
| JP | 10-45904 | 2/1998 |
| WO | WO 91/12285 | 8/1991 |
| WO | WO 92/12162 | 7/1992 |
| WO | WO 94/21700 | 9/1994 |
| WO | WO 96/08498 | 3/1996 |
| WO | WO 97/42197 | 11/1997 |
| WO | WO 97/45434 | 12/1997 |
| WO | WO9748735 | * 12/1997 |
| WO | WO 97/48735 | 12/1997 |
| WO | WO 97/48736 | 12/1997 |
| WO | WO 98/27124 | 6/1998 |
| WO | WO 98/30569 | 7/1998 |
| WO | WO 98/30612 | 7/1998 |
| WO | WO 98/34964 | 8/1998 |
| WO | WO 98/37106 | 8/1998 |
| WO | WO 98/37109 | 8/1998 |
| WO | WO 98/46651 | 10/1998 |
| WO | WO 98/55467 | 12/1998 |
| WO | WO 99/01460 | 1/1999 |
| WO | WO 99/02472 | 1/1999 |
| WO | WO 99/02536 | 1/1999 |
| WO | WO 99/12981 | 3/1999 |
| WO | WO 99/46303 | 9/1999 |
| WO | WO 99/46304 | 9/1999 |

OTHER PUBLICATIONS

*Organometallics*, Bei et al., vol. 16, pp. 3282–3302 (1997).
*Organometallics*, Wang et al., vol. 17, pp. 3149–3151 (1998).
*Organometallics*, Horton et al., vol. 15, pp. 2672–2674 (1996).
*Macromolecules*, Repo et al., vol. 30, pp. 171–175 (1997).
*Polyhedron*, Guerin et al., vol. 17, (5–6), pp. 917–923 (1998).
*Inorganic Chemistry*, Fuhrmann et al., vol. 35, pp. 6742–6745 (1996).
*Organometallics*, Guerin et al., vol. 15 (26), pp. 5586–5590 (1996).
*Organometallics*, Guerin et al., vol. 17 (23), pp. 5172–5177 (1998).
*Macromolecular Chemistry and Physics*, Silvestro et al., vol. 197, No. 10, pp. 3209–3228 (1996).
*Journal of Organometallics Chemistry*, Harkonen et al., vol. 519, pp. 205–208 (1996).
*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Guerin et al., vol. 15, pp. 5085–5089 (1996).

* cited by examiner

*Primary Examiner*—David W. Wu
*Assistant Examiner*—William K Cheung
(74) *Attorney, Agent, or Firm*—Lisa Kimes Jones; Kevin M. Faulkner

(57) ABSTRACT

The present invention relates to a Group 15 containing transition catalyst compound, a catalyst system and a supported catalyst system thereof and to a process for polymerizing olefin(s) utilizing them.

10 Claims, No Drawings

TRANSITION METAL CATALYST COMPOUNDS HAVING DEUTERIUM SUBSTITUTED LIGAND AND CATALYST SYSTEMS THEREOF

RELATED APPLICATION DATA

The present application is a Continuation-In-Part of U.S. patent application Ser. No. 09/864,571 filed May 24, 2001, U.S. Pat. No. 6,534,604 which is a Divisional of U.S. Ser. No. 09/425,387, filed Oct. 22, 1999, now issued as U.S. Pat. No. 6,274,684.

FIELD OF THE INVENTION

The present invention relates to a Group 15 containing transition metal catalyst compounds having a deuterium substituted ligand, catalysts systems thereof and their use in the polymerization of olefin(s).

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing metallocene catalyst systems.

Recently, developments have lead to the discovery of anionic, multidentate heteroatom ligands as discussed by the following articles: (1) Kempe et al., "Aminopyridinato Ligands—New Directions and Limitations", 80$^{th}$ Canadian Society for Chemistry Meeting, Windsor, Ontario, Canada, Jun. 1–4, 1997; (2) Kempe et al., *Inorg. Chem.* 1996 vol 35 6742; (3) Jordan et al. of polyolefin catalysts based on hydroxyquinolines (Bei, X.; Swenson, D. C.; Jordan, R. F., *Organometallics* 1997, 16, 3282); (4) Horton, et. al., "Cationic Alkylzirconium Complexes Based on a Tridentate Diamide Ligand: New Alkene Polymerization Catalysts", Organometallics, 1996, 15, 2672–2674 relates to tridentate zirconium complexes; (5) Baumann, et al., "Synthesis of Titanium and Zirconium Complexes that Contain the Tridentate Diamido Ligand [((t-Bu-d$_6$)N—O—C$_6$H$_4$)$_2$O]$^{2-}$ {[NON}$^{2-}$) and the Living Polymerization of 1-Hexene by Activated [NON]ZrMe2", Journal of the American Chemical Society, Vol. 119, pp. 3830–3831; (6) Cloke et al., "Zirconium Complexes incorporating the New Tridentate Diamide Ligand [(Me$_3$Si)N{CH$_2$CH$_2$N(SiMe$_3$)}$_2$]$^{2-}$(L); the Crystal Structure of [Zr(BH$_4$)$_2$L] and [ZrCl{CH(SiMe$_3$)$_2$}L]", J. Chem. Soc. Dalton Trans, pp. 25–30, 1995; (7) Clark et al., "Titanium (IV) complexes incorporating the aminodiamide ligand [(SiMe$_3$)N{CH$_2$CH$_2$N(SiMe$_3$)}$_2$]$^{2-}$(L); the X-ray crystal structure of [TiMe$_2$(L)] and [TiCl{CH(SiMe$_3$)$_2$}(L)]", Journal of Organometallic Chemistry, Vol 50, pp. 333–340, 1995; (8) Scollard et al., "Living Polymerization of alpha-olefins by Chelating Diamide Complexes of Titanium", J. Am. Chem. Soc., Vol 118, No. 41, pp. 10008–10009, 1996; and (9) Guerin et al., "Conformationally Rigid Diamide Complexes: Synthesis and Structure of Titanium (IV) Alkyl Derivatives", Organometallics, Vol 15, No. 24, pp. 5085–5089, 1996.

U.S. Pat. No. 5,576,460 describes a preparation of arylamine ligands and U.S. Pat. No. 5,889,128 discloses a process for the living polymerization of olefins using initiators having a metal atom and a ligand having two group 15 atoms and a group 16 atom or three group 15 atoms. EP 893 454 A1 also describes preferably titanium transition metal amide compounds. U.S. Pat. No. 5,318,935 discusses amido transition metal compounds and catalyst systems especially for the producing isotactic polypropylene. Polymerization catalysts containing bidentate and tridentate ligands are further discussed in U.S. Pat. No. 5,506,184.

In addition, U.S. Pat. No. 6,271,325 discloses a catalyst system comprising a support, an activator and a metal catalyst compound comprising a group 3 to 14 metal atom bound to at least one anionic leaving group and also bound to at least two group 15 atoms, at least one of which is also bound to a group 15 or 16 atom through another group which may be a C$_1$ to C$_{20}$ hydrocarbon group, a heteroatom containing group, silicon, germanium, tin, lead, or phosphorus, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

While all these compounds have been described in the art, there is still a need for an improved polymerization catalyst compounds and for catalyst compositions, having enhanced activity, which include these compounds.

SUMMARY OF THE INVENTION

This invention provides for an improved catalyst compound having a deuterium substituted ligand, a catalyst system including the catalyst compound, and for its use in olefin polymerizing processes.

In one embodiment, the invention is directed to a Group 15 containing metal catalyst compound having a deuterium substituted ligand.

In another embodiment, the invention is directed to a catalyst compound having a transition metal bound to at least one leaving group and also bound to at least two Group 15 atoms, which is also bound to a Group 15 or 16 atom through another group, where at least one of the group 15 atoms is bound to a deuterium atom or to a deuterium atom containing substituent.

In another embodiment, the invention is directed to catalyst systems including processes for polymerizing olefin(s), particularly in a gas phase or slurry phase process, utilizing any one of the catalyst systems or supported catalyst systems discussed above.

DETAILED DESCRIPTION OF THE INVENTION

Introduction

Catalyst deactivation often can involve the cleavage of an X—H bond, where X can be carbon, nitrogen, oxygen, silicon, phosphorus and the like. If this occurs the rate of the reaction may be substantially decreased by substituting the hydrogen atom with a deuterium atom. In addition, substitution of hydrogen by deuterium can affect agostic interactions, which are know to substantially affect polymerization selectivity and kinetics. In the present application, it has been unexpectedly found that Group 15 containing metal catalyst compounds, having a deuterium substituted ligand, exhibit much higher catalyst productivity as compared to their hydrogen-substituted analogs. As a result of this discovery it is now possible to provide a highly active polymerization with commercially acceptable level of productivity.

Furthermore, it has also been discovered that these Group 15 containing metal catalyst compounds, having a deuterium substituted ligand provide for improved supported catalysts system, particularly for use in slurry phase or gas phase polymerizations. It is well known in the art that supporting catalyst compounds typically results in a lowering of the overall catalyst productivity. However, as a result of the substantially higher activity of the deuterium substituted multidentate compounds of the present invention, these catalysts compounds are supportable and retain commercially useful productivities.

For the purposes of this patent specification, the term "catalyst" refers to a metal compound, that when combined with an activator, polymerizes olefins, and the term "catalyst system" refers to the combination of a catalyst, an activator, and optionally a support material.

Group 15 Containing Catalyst Compound and Catalyst Systems

In one embodiment, the deuterium atom containing catalyst compounds of the invention are Group 15 bidentate or tridentate ligated transition metal compound, where at least one Group 15 atom is bound to a deuterium atom or to a deuterium atom containing substituent. The preferred Group 15 elements are nitrogen and/or phosphorous, and more preferably nitrogen.

The Group 15 containing catalyst compounds of the invention generally include a metal atom bound to at least one leaving group and also bound to at least two Group 15 atoms, at least one of which is also bound to a Group 15 or 16 atom through another group, and where at least one of the Group 15 atoms is bound to a deuterium atom or to a deuterium atom containing substituent.

In one embodiment, at least one of the Group 15 atoms is also bound to a Group 15 or 16 atom through another group, which may be a hydrocarbon group, preferably a hydrocarbon group having 1 to 20 carbon atoms, a heteroatom containing group including preferably silicon, germanium, tin, lead and/or phosphorus. In this embodiment, it is further preferred that the Group 15 or 16 atom be bound to nothing or to a deuterium atom, a hydrogen atom, a Group 14 atom containing group, a halogen, or a heteroatom containing group. Additionally in this embodiment, it is preferred that each of the two Group 15 atoms are also bound to a cyclic group that may optionally be bound to deuterium, a deuterium containing group, hydrogen, a halogen, a heteroatom, a hydrocarbyl group, or a heteroatom containing group.

In one embodiment of the invention, the Group 15 containing metal compound of the invention is represented by the formulae:

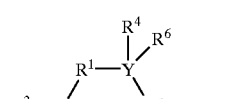

Formula (I)

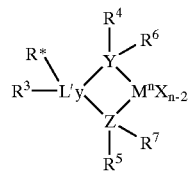

Formula (II)

In Formula (I) and (II) M is a metal atom, preferably a Group 3 to 14 metal atom, more preferably a Group 3 to 7, more preferably a Group 4 to 6, and even more preferably a Group 4 metal atom. Most preferably M is titanium, zirconium, or hafnium.

Each X is independently a leaving group, preferably an anionic leaving group. More preferably each X is independently hydrogen, a hydrocarbyl group, a heteroatom, or a halogen. Even more preferably each X is an alkyl or an aryl substituted alkyl such as benzyl.

y is 0 or 1 (when y is 0 group L' is absent).

n is the oxidation state of M, preferably +2, +3 or +4, and more preferably +4.

m is the formal charge of the YZL ligand or the YZL' ligand. Preferably m is 0, −1, −2 or −3, and more preferably −2.

L is a Group 15 or 16 element, preferably nitrogen;

L' is a Group 15 or 16 element or Group 14 containing group, preferably carbon, silicon or germanium;

Y is a Group 15 element, preferably nitrogen or phosphorus, and more preferably nitrogen;

Z is a Group 15 element, preferably nitrogen or phosphorus, and more preferably nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or arylalkyl group, more preferably a linear, branched or cyclic $C_2$ to $C_{20}$ alkyl group, most preferably a $C_2$ to $C_6$ hydrocarbon group.

$R^3$ is absent, deuterium, hydrogen, a halogen, a hydrocarbyl group which may or may not contain a deuterium atom, or a heteroatom containing group which may or may not contain one or more a deuterium atom(s). Preferably $R^3$ is a linear, cyclic or branched alkyl group having 1 to 20 carbon atoms, and more preferably $R^3$ is absent, deuterium, hydrogen or an alkyl group which may or may not contain one or more deuterium atom(s). Most preferably $R^3$ is deuterium or hydrogen.

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ arylalkyl group, or a heteroatom containing group, for example $PR_3$, where R is an alkyl group.

In a preferred embodiment, one or more hydrogen atoms contained in groups represented by $R^4$ and/or $R^5$ may be substituted with one or more deuterium atom(s).

$R^1$ and $R^2$ may be interconnected to each other, and/or $R^4$ and $R^5$ may be interconnected to each other.

$R^1$ and $R^7$ are independently absent, deuterium, hydrogen, an alkyl group, halogen, a heteroatom or a hydrocarbyl group, preferably a linear, cyclic or branched alkyl group having 1 to 20 carbon atoms. More preferably $R^6$ and $R^7$ are absent.

$R^*$ is absent, deuterium, hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear or branched alkyl or alkenyl radical, an alkynyl, cycloalkyl, aryl, acyl, aroyl, alkoxy, aryloxy, alkylthio, dialkylamino, alkoxycarbonyl, aryloxycarbonyl, carbamoyl, alkyl- or dialkyl-carbamoyl, acyloxy, acylamino, aroylamino, straight, branched or cyclic alkylene radical, or a combination thereof. An arylalkyl group is defined to be a substituted aryl group.

In a preferred embodiment, $R^6$ and $R^7$ are absent and $R^4$ and $R^5$ are each independently represented by the following formula:

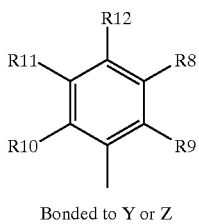

Formula (III)

Bonded to Y or Z wherein $R^8$ to $R^{12}$ are each independently a deuterium atom, a deuterium atom containing group, hydrogen, a $C_1$ to $C_{40}$ alkyl group which may contain deuterium substituents, a halide, a heteroatom, a heteroatom containing group containing up to 40 carbon atoms, preferably a $C_1$ to $C_{20}$ linear or branched alkyl group which may contain deuterium substituents, preferably a methyl, ethyl, propyl or butyl group. Any two of $R^8$ to $R^{12}$ groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), which may contain a deuterium substituent. In a preferred embodiment $R^9$, $R^{10}$ and $R^{12}$ are methyl groups containing one or more deuterium atoms, and $R^8$ and $R^{11}$ are hydrogen. In another preferred embodiment $R^9$, $R^{10}$ and $R^{12}$ are deuterated methyl groups and $R^1$ and $R^{11}$ are hydrogen or deuterium.

In a particularly preferred embodiment $R^4$ and $R^5$ are both a group represented by the following formula:

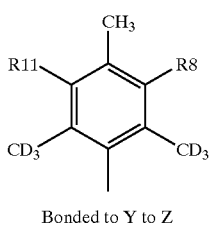

Formula (IV)

Bonded to Y to Z

In another particular preferred embodiment, M is a Group 4 metal; each of L, Y, and Z is nitrogen; each of $R^1$ and $R^2$ is a hydrocarbyl group, preferably —CH$_2$—CH$_2$—; $R^3$ is hydrogen or deuterium; $R^4$ and $R^5$ are independently represented by Formula (IV) and $R^6$ and $R^7$ are absent.

The deuterium containing catalyst compounds of the invention are prepared by methods known in the art. A preferred direct synthesis of the compounds described above includes reacting the neutral ligand, (see for example YZL or YZL' of Formula I or II) with a deuterated compound such as for example CH$_3$OD, then reacting with a compound of the formula MX$_n$, where n is the oxidation state of metal M, and each X is an anionic group, such as halide, alkyl, heteroatom substituted alkyl or arylalkyl, in a non-coordinating or weakly coordinating solvent, such as ether, toluene, xylene, benzene, methylene chloride, and/or hexane or other solvent having a boiling point above 60° C., at about 20° C. to about 150° C. (preferably 20° C. to 100° C.), preferably for 24 hours or more. In the case of X=halide, the mixture is then treated with an excess (such as four or more equivalents) of an alkylating agent, such as methyl magnesium bromide in ether. The magnesium salts are removed by filtration, and the metal complex isolated by standard techniques.

In another embodiment, the metal complex as prepared above with or without deuterium atoms, is pressurized with stirring under deuterium gas, with or without an activator, such as an alumoxane. Preferably, the resulting mixture is quenched with a source of deuterons, such as D$_2$O, and the neutral ligand isolated. The metal complex can then be formed from the deuterium containing ligand by the methods described above.

Activator and Activation Methods

The deuterium substituted Group 15 containing metal polymerization catalyst compounds of the invention are typically combined with an activator compound to yield compounds having a vacant coordination site that will coordinate, insert, and polymerize olefin(s). For the purposes of this patent specification and appended claims, the term "activator" is defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts.

Aluminoxane and Aluminum Alkyl Activators

In one embodiment, alumoxanes activators are utilized as an activator in the catalyst systems of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Aluminum alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+(A^{d-}) \qquad (V)$$

wherein

L is an neutral Lewis base;

H is hydrogen;

$(L-H)^+$ is a Bronsted acid $A^{d-}$ is a non-coordinating anion having the charge d– d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2–6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Supports, Carriers and General Supporting Techniques

The above describe deuterium Group 15 containing catalyst compounds and catalyst systems may be combined with one or more support materials or carriers using one of the support methods well known in the art or as described below. For example, in a most preferred embodiment, the Group 15 containing catalyst compound or catalyst system is in a supported form, for example deposited on, contacted with, vaporized with, bonded to, or incorporated within, adsorbed or absorbed in, or on, a support or carrier.

The terms "support" or "carrier" are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds or any other organic or inorganic support material and the like, or mixtures thereof The preferred carriers are inorganic oxides that include those Group 2, 3, 4, 5, 13 or 14 metal oxides. The preferred supports include silica, alumina, silica-alumina, and mixtures thereof. Other useful supports include magnesia, titania, zirconia, magnesium chloride, montmorillonite (EP-B1 0 511 665), phyllosilicate, zeolites, talc, clays and the like. Also, combinations of these support materials may be used, for example, silica-chromium, silica-alumina, silica-titania and the like. Additional support materials may include those porous acrylic polymers described in EP 0 767 184 B1, which is incorporated herein by reference.

It is preferred that the carrier, most preferably an inorganic oxide, has a surface area in the range of from about 10 to about 100 m²/g, pore volume in the range of from about 0.1 to about 4.0 cc/g and average particle size in the range of from about 5 to about 500 μm. More preferably, the surface area of the carrier is in the range of from about 50 to about 500 m²/g, pore volume of from about 0.5 to about 3.5 cc/g and average particle size of from about 10 to about 200 μm. Most preferably the surface area of the carrier is in the range is from about 100 to about 400 m²/g, pore volume from about 0.8 to about 5.0 cc/g and average particle size is from about 5 to about 100 μm. The average pore size of the carrier of the invention typically has pore size in the range of from 10 to 1000 Å, preferably 50 to about 500 Å, and most preferably 75 to about 450 Å.

Examples of supporting catalyst systems, which may be applied to the present catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. No. 271,598 filed Jul. 7, 1994 U.S. Pat. No. 5,468,702 and Ser. No. 788,736 filed Jan. 23, 1997 U.S. Pat. No. 6,090,740 and PCT publications WO 95/32995, WO 95/14044, WO 96/06187 and WO 97/02297, and EP-B1-0 685 494 all of which are herein fully incorporated by reference.

There are various other methods in the art for supporting a polymerization catalyst compound or catalyst system of the invention. For example, the Group 15 containing catalyst compound of the invention may contain a polymer bound ligand as described in U.S. Pat. Nos. 5,473,202 and 5,770,755, which is herein fully incorporated by reference; the Group 15 containing catalyst compounds of the invention may be spray dried as described in U.S. Pat. No. 5,648,310, which is herein fully incorporated by reference; the support used with the Group 15 containing catalyst compounds of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a deuterium substituted Group 15 element containing catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene-1.

In a preferred embodiment, the deuterium substituted Group 15 compound containing catalyst system can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998 abandoned.

Another method for producing a deuterium substituted supported Group 15 containing catalyst system is described below and is described in U.S. application Ser. No. 265,533, filed Jun. 24, 1994 abandoned and Ser. No. 265,532, filed Jun. 24, 1994 abandoned and PCT publications WO 96/00245 and WO 96/00243 both published Jan. 4, 1996, all of which are herein fully incorporated by reference. In this preferred method, the deuterium substituted Group 15 containing metal catalyst compound is slurried in a liquid to form a solution and a separate solution is formed containing an activator and a liquid. The liquid may be any compatible solvent or other liquid capable of forming a solution or the like with the Group 15 containing catalyst compounds and/or activator of the invention. In the most preferred embodiment the liquid is a cyclic aliphatic or aromatic hydrocarbon, most preferably toluene. The Group 15 containing catalyst compounds and activator solutions are mixed together and added to a porous support such that the total volume of Group 15 containing catalyst compound solution and the activator solution or the Group 15 containing catalyst compound solution and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

Other methods for supporting the Group 15 metal compounds of the invention are described in U.S. application Ser. No. 09/312,878, filed May 17, 1999 U.S. Pat. No. 6,271,325 which is fully incorporated herein by reference.

The mole ratio of the metal of the activator component to the metal of the supported deuterium substituted Group 15 containing metal catalyst compound are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the deuterium substituted Group 15 containing metal catalyst compound is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of a supported deuterium substituted Group 15 containing catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymerization Process

The catalyst systems, supported catalyst systems or compositions of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C. In another embodiment the temperature is above 60° C., preferably above 80° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference.

A preferred process of the invention is where the process, preferably a slurry or gas phase process is operated in the presence of deuterium substituted Group 15 containing metal catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In an embodiment, the method of the invention provides for injecting an unsupported deuterium substitute Group 15 containing metal catalyst system into a reactor, particularly a gas phase reactor. In one embodiment the Group 15 containing metal polymerization catalyst is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with an activator together or separately to a reactor using the injection methods described in PCT publication WO 97/46599, which is fully incorporated herein by reference. Where an unsupported deuterium substituted Group 15 containing metal catalyst compound is used the mole ratio of the metal of the activator component to the metal of the catalyst compound is in the range of between 0.3:1 to 10,000:1, preferably 100:1 to 5000:1, and most preferably 500:1 to 2000:1.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from no measurable flow to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

All gases, toluene and hexane were passed through individual sets of one gallon cylinders containing 13× molecular sieves and de-oxo catalyst before use. The hexane was stored in a 10 gallon tank pressurized under 120 psi of nitrogen while slowly allowing to purge. All reactions were done under an atmosphere of purified nitrogen unless stated otherwise.

MAO (4.5M in toluene) was obtained from Albemarle. SMAO was prepared as follows: For a 1 Kg batch, 1158.43 grams of 30 wt % MAO in toluene (7.3 wt % Al) available from Albemarle Corporation, Baton Rouge, La., and 2400 grams of extra toluene are charged into an 8 liter mix tank equipped with ribbon helical agitator. 984 grams of Davison 955–600 silica is added to MAO in toluene solution at ambient temperature. A 10° C. exotherm occurs from reaction of the MAO with the hydroxyl groups. The slurry mixes for 30 minutes at ambient temperature. Drying then occurs by heating the mix tank jacket to about 70° C. and reducing pressure to 0.00 mm/hg. As the slurry thickens the agitator rpm is reduced to minimum rotation, about 40–60 RPM. Then the rotation is slowly increased (to about 600 RPM) and the temperature is raised to 95° C. as the slurry turns to a dry powder. A nitrogen sweep (about 0.5 cc/min per gram of silica charged) can be used during the end of the drying step to help remove toluene from the silica pores. The material is typically held at 95° C. until toluene removal stops, and material temperature lines out near jacket temperature. The material temperature does not change for at least 30 minutes before the supported methylalumoxane (SMAO) is considered dry. Residual toluene is reduced to less than 2 wt % on the solids. The typical aluminum loading is 4.5 mmol/g.

The HN3 ligand was prepared as described in the literature. Deuterium gas (99.8 atom %) and $CH_3OD$ were obtained from Isotec.

Example 1

Preparation of HN3Zr

A 1000 mL round-bottomed flask was charged with 77.93 g of $Zr(CH_2Ph)_4$ and 600 mL dry toluene. To the resulting dark-brown solution was added 58.0 g of HN3 ligand (22 mmol) and the resulting mixture stirred in the dark for 20 hours. The volume was reduced in half by rotary evaporation and an equal amount of hexane was added. After stirring 1 hour, the light yellow solids were collected by filtration, washed with 10 mL hexane and dried under vacuum to yield 59.89 g of light yellow solid. A second crop was obtained from the mother liquors in a similar manner to yield a total of 63.04 g (60%) of light yellow solid. $^1$H NMR (500 MHz, $C_6D_6$): $\delta$7.18 (tm, 2H, J=8.7 Hz), 7.08 (d, 2H, J=7.6 Hz), 6.93–6.87 (m, 7H), 6.84 (tm, 1H, J=7.2 Hz), 5.89 (m, 2H), 3.36 (m, 2H), 3.08 (m, 2H), 3.01 (m, 1H), 2.53 (m, 2H), 2.44 (m, 2H), 2.40 (s, 6H), 2.39 (s, 6H), 2.15 (s, 6H), 1.87 (s, 2H), 0.96 (s, 2H).

Example 2

Preparation of DN3-$d_1$ Ligand

A 200 mL Schlenk flask was charged with 3.0 g of HN3 ligand (8.8 mmol) and 15 mL $CH_3OD$ (99.5 atom %) and the solution stirred 30 minutes before removing the methanol under vacuum. This was repeated 3 more times to yield 2.88 g (96%) of chunky brown powder. $^1$H NMR (300 MHz, $C_6D_6$) revealed that the N—H resonance normally at $\delta$3.38 was absent: $\delta$6.81 (s, 4H), 2.84 (appar t, 4H, J=ca. 5 Hz), 2.48 (appar t, 4H, J=ca. 5 Hz), 2.25 (s, 12H), 2.20 (s, 6H).

Example 3

Preparation of DN3Zr-$d_1$

A 100 mL round bottomed flask was charged with 3.69 g (8.1 mmol) of $Zr(CH_2Ph)_4$ and 30 mL of toluene followed by 2.76 g of DN3-$d_1$ ligand (8.1 mmol) and stirred in the dark for 3 hrs. The volume was reduced in half by rotary evaporation and an equal volume of hexane added to induce precipitation. After 1 hr, the precipitate was collected by filtration to yield 2.75 g of dull yellow powder (4.49 mmol, 55%). $^1$H NMR (300 MHz, $C_6D_6$) revealed a normal spectrum of HN3Zr except that the N—H resonance at $\delta$3.01 was absent.

Example 4

Preparation of HN3-$d_{12}$ Ligand

A 300 mL Parr reactor was charged in the drybox with 10.0 g HN3ZrBz$_2$ (16.4 mmol) and 200 mL dry toluene. The reactor was then sealed, removed from the drybox and pressurized to 1527 psi with deuterium gas while stirring at 200 RPM before heating to 80° C. The pressure peaked at 1544 psi and then slowly dropped to 1320 psi after 3.5 hrs. An aliquot quenched into $D_2O$ at this point revealed 77% deuteration of the ortho methyl groups. The reactor was re-pressurized to 1460 psi and held at 80° C. while stirring overnight. After a total of 20 hours at conditions, the reactor was cooled, vented and discharged into Schlenk flask in the drybox. To the amber-colored solution was slowly added 30 mL $D_2O$ followed by 100 mL of 0.1 M NaOH. The organic layer was removed, dried over $MgSO_4$, filtered and stripped to a viscous liquid, which was dissolved in 30 mL hexane and chilled to −20° C. The resulting white, crystalline solid was isolated and dried to yield 3.81 g of HN3-$d_{12}$ ligand (66% yield), calculated to be 84% deuterated in the ortho-methyl positions by NMR integration. A similar preparation yielded 3.94 g of HN3-$d_{12}$ ligand (69% yield) calculated to be 82% deuterated in the ortho-methyl positions by $^1$H NMR integration.

Example 5

Preparation of HN3Zr-$d_{12}$

A 200 mL round-bottomed flask was charged with 10.0 g $Zr(CH_2Ph)_4$ (22 mmol) and 65 mL dry toluene. To the resulting dark-brown solution was added 7.8 g of HN3-$d_{12}$ ligand (22 mmol) and the resulting mixture stirred in the dark for 2 hours. The volume was reduced in half by rotary evaporation and an equal amount of hexane was added. After stirring 1 hour, the light yellow solids were collected by filtration, washed with 10 mL hexane and dried under vacuum to yield 7.21 g of light yellow solid. A second crop was obtained from the mother liquors in a similar manner to yield a total of 8.22 g (61%) of light yellow HN3Zr-Bz$_2$-$d_{12}$. $^1$H NMR integration revealed 79% deuteration of the ortho-methyl position with no evidence of deuterium incorporation elsewhere in the molecule. This was confirmed by $^2$H NMR (46 MHz, toluene solvent) which revealed only a single broad peak at $\delta$2.36 (vs. $\delta$7.20 for $C_6D_6$ internal standard).

Example 6

Preparation of HN3-$d_{22}$ Ligand

A solution of 10.0 g of mesitylene-$d_{12}$ (75.6 mmol) in 20 mL $CCl_4$ and 20 mL $CH_3CN$ was treated with 13.5 g N-bromosuccimide (75.6 mmol) and 5 drops of aqueous HBr and then stirred 24 hours. After filtration, the mixture was evaporated and then partitioned between ether and dilute aqueous sodium bicarbonate. The organic layer was washed with brine and dried over sodium sulfate. Evaporation provided 13.8 g of 2-bromomesitylene-$d_{11}$ 87% yield, which was characterized by GC/MS.

A 200 mL Schlenk flask was charged under nitrogen with 10.6 g of 2-bromomesitylene-$d_{11}$ (50.0 mmol), 2.6 g of diethylamine (25.0 mmol), 115 mg of tris (benzylideneacetone) dipalladium (0.125 mmol), 243 mg of rac-2,2'-bis(diphenylphosphine-1,1'-binaphthyl) (BINAP), 7.20 g sodium t-butoxide (75 mmol) and 100 mL toluene. The deep red mixture was heated at 95° C. for 40 hours. The temperature was reduced to 50° C. and the volatiles removed under vacuum during 2.5 hrs. The residue was suspended in ether and filtered to provide a burgandy-colored filtreate which was washed 2× with water and 1× with brine before drying over $MgSO_4$. The ether was removed under vacuum and the residue heated at 70° C. for 4 hrs. The resulting red oil solidified on standing to provide 6.25 g (17.3 mmol, 69%) of a chunky red powder. $^1$H NMR (300 MHz, $C_6D_6$):

δ3.32 (br S, 1H, N—H), 2.84 (appar t, 4H, J=ca. 5 Hz), 2.48 (appar t, 4H, J=ca. 5 Hz).

Example 7

Preparation of HN3Zr-$d_{22}$

A 100 mL round bottomed flask was charged with 3.92 g (8.6 mmol) of Zr(CH$_2$Ph)$_4$ and 30 mL of toluene followed by 3.12 g of HN3-$d_{22}$ ligand (8.6 mmol) and stirred in the dark for 3 hrs. The volume was reduced in half by rotary evaporation and an equal volume of hexane added to induce precipitation. After 1 hr, the precipitate was collected by filtration to yield 3.99 g of dull yellow powder (6.3 mmol, 73%). $^1$H NMR (300 MHz, C$_6$D$_6$): δ7.18 (t, 2H, J=8.0 Hz), 7.08 (d, 2H, J=7.6 Hz), 6.94–6.87 (m, 4H), 6.84 (tm, 1H, J=7.2 Hz), 5.89 (m, 2H), 3.36 (m, 2H), 3.08 (m, 2H), 3.01 (m, 1H), 2.53 (m, 2H), 2.44 (m, 2H), 1.87 (s, 2H), 0.96 (s, 2H).

Example 8

Preparation of DN3-$d_{23}$ Ligand

A 200 mL Schlenk flask was charged with 3.0 g of HN3-d22 ligand (8.8 mmol) and 15 mL CH$_3$OD (99.5 atom %) and the solution stirred 30 minutes before removing the methanol under vacuum. This was repeated 3 more times to yield 2.79 g (96%) of chunky brown powder. $^1$H NMR (300 MHz, C$_6$D$_6$) revealed that the N—H resonance normally at δ3.32 was absent: δ2.84 (appar t, 4H, J=ca. 5 Hz), 2.48 (appar t, 4H, J=ca. 5 Hz).

Example 9

Preparation of DN3Zr-$d_{23}$

A 100 mL round bottomed flask was charged with 3.1 g (6.8 mmol) of Zr(CH$_2$Ph)$_4$ and 30 mL of toluene followed by 2.48 g of DN3-$d_{23}$ ligand (6.8 mmol) and stirred in the dark for 3 hrs. The volume was reduced in half by rotary evaporation and an equal volume of hexane added to induce precipitation. After 1 hr, the precipitate was collected by filtration to yield 2.15 g of dull yellow powder (3.4 mmol, 50%). $^1$H NMR (300 MHz, C$_6$D$_6$) revealed the normal spectrum of HN3Zr-$d_{22}$ except the N—H peak at δ3.01 was absent: δ7.18 (t, 2H, J=8.0 Hz), 7.08 (d, 2H, J=7.6 Hz), 6.94–6.87 (m, 4H), 6.84 (tm, 1H, J=7.2 Hz), 5.89 (m, 2H), 3.36 (m, 2H), 3.08 (m, 2H), 2.53 (m, 2H), 2.44 (m, 2H), 1.87 (s, 2H), 0.96 (s, 2H).

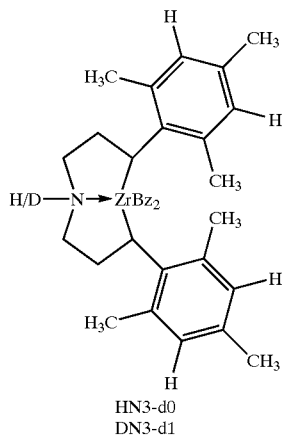

HN3-d0
DN3-d1

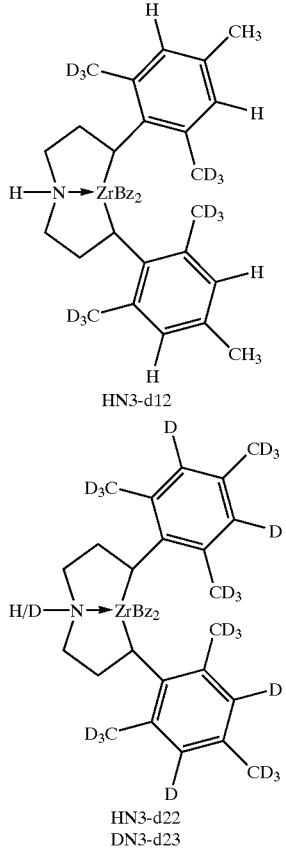

HN3-d12

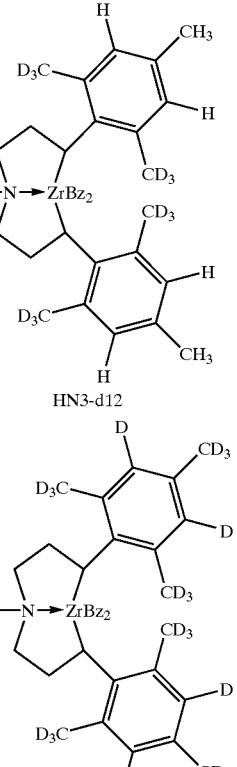

HN3-d22
DN3-d23

Examples 10–22

Polymerization

General Procedure for Polymerization

Catalyst was prepared by rolling 20 μmol of the Zr complex, 0.49 g of the supported MAO (Al/Zr=110) and 2.85 g of purified Kaydol oil for 48 hours. A computer controlled, one liter 316 stainless steel reactor with air-operated two-wing paddle and an inner steam-heated shell and an outer water-cooled shell was dried by heating to 135° C. while purging with 500 sccm of nitrogen for 30 minutes. After cooling to 50° C., it was charged with 600 mL hexane and 2 mL 1-hexene under inert conditions. A catalyst charging vessel comprising a ¼ inch (0.64 cm)×2"(5 cm) stainless steel tube isolated between two ball valves with a 25 ml stainless steel reservoir on top was charged with the polymerization catalyst in a drybox and then attached to the reactor against a nitrogen purge. The reservoir above the injection tube was pressurized to 250 psi with nitrogen. A solution of 100 micromoles of tri-isobutylaluminum (TIBA) was then added to the reactor and the reactor sealed. When the reactor reached conditions (135 psi ethylene, 85° C., 90 minutes), the catalyst was injected using the nitrogen pressure from the reservoir and held at conditions for the requisite time. The reaction was ended by venting and cooling. The results are shown in Table 1.

Examples 23–57

Polymerization

These examples were performed as examples 10–22 except the 1-hexene was omitted from the polymerization reaction. The results are also shown in Table 1.

TABLE 1

Polymerization Results

| Example | Catalyst | μmol Zr | actual g PE | g PE/mmol Zr/100 psi/hr |
|---|---|---|---|---|
| 10 | HN3Zr | 1.38 | 21.4 | 7658 |
| 11 | HN3Zr | 1.42 | 20.5 | 7129 |
| 12 | HN3Zr | 1.3 | 18.2 | 6914 |
| 13 | HN3Zr | 1.66 | 23.2 | 6902 |
| 14 | HN3Zr | 1.5 | 21.9 | 7210 |
| 15 | HN3Zr-d12 | 1.31 | 37.9 | 14287 |
| 16 | HN3Zr-d12 | 1.44 | 49.4 | 16941 |
| 17 | HN3Zr-d12 | 1.45 | 49 | 16688 |
| 18 | DN3Zr-d1 | 1.68 | 25.3 | 7437 |
| 19 | DN3Zr-d1 | 1.59 | 25.7 | 7982 |
| 20 | HN3Zr-d22 | 1.23 | 40.8 | 16381 |
| 21 | HN3Zr-d22 | 1.22 | 40.8 | 16515 |
| 22 | HN3Zr-d22 | 1.19 | 41.9 | 17388 |
| 23 | HN3Zr | 1.34 | 14.6 | 5381 |
| 24 | HN3Zr | 1.44 | 24.2 | 8299 |
| 25 | HN3Zr | 1.35 | 24.4 | 8925 |
| 26 | HN3Zr | 1.35 | 21.9 | 8011 |
| 27 | HN3Zr | 1.49 | 23.2 | 7689 |
| 28 | HN3Zr | 1.49 | 24 | 7954 |
| 29 | HN3Zr | 1.46 | 26.2 | 8862 |
| 30 | HN3Zr | 1.44 | 26.2 | 8985 |
| 31 | HN3Zr-d12 | 1.75 | 40.8 | 11513 |
| 32 | HN3Zr-d12 | 1.29 | 36 | 13781 |
| 33 | HN3Zr-d12 | 1.4 | 34.5 | 12169 |
| 34 | HN3Zr-d12 | 1.32 | 35.7 | 13356 |
| 35 | HN3Zr-d12 | 1.39 | 35 | 12434 |
| 36 | DN3Zr-d1 | 1.3 | 23.1 | 8775 |
| 37 | DN3Zr-d1 | 1.78 | 14.9 | 4134 |
| 38 | DN3Zr-d1 | 2.1 | 32.9 | 7737 |
| 39 | DN3Zr-d1 | 2.11 | 38.7 | 9057 |
| 40 | DN3Zr-d1 | 1.71 | 36.1 | 10425 |
| 41 | DN3Zr-d1 | 1 | 21.9 | 10815 |
| 42 | DN3Zr-d1 | 1.14 | 23.6 | 10223 |
| 43 | DN3Zr-d1 | 1.21 | 25.1 | 10244 |
| 44 | HN3Zr-d22 | 1.31 | 52.2 | 19678 |
| 45 | HN3Zr-d22 | 1.29 | 50 | 19141 |
| 46 | HN3Zr-d22 | 1.52 | 61.2 | 19883 |
| 47 | HN3Zr-d22 | 1.34 | 57.9 | 21338 |
| 48 | DN3-d23 | 1.16 | 51.9 | 22095 |
| 49 | DN3-d23 | 1.2 | 55.1 | 22675 |
| 50 | DN3-d23 | 1.41 | 67.7 | 23711 |
| 51 | HN3Hf | 1.28 | 29 | 11188 |
| 52 | HN3Hf | 1.84 | 32 | 8588 |
| 53 | HN3Hf | 1.85 | 36.9 | 9850 |
| 54 | HN3Hf | 1.5 | 28.6 | 9416 |
| 55 | HN3Hf-d12 | 1.66 | 41.5 | 12346 |
| 56 | HN3Hf-d12 | 1.27 | 39.3 | 15281 |
| 57 | HN3Hf-d12 | 1.52 | 50.8 | 16504 |

While the present invention has been described and illustrated by reference to particular embodiments, those of ordinary skill in the art will appreciate that itself to variations not necessarily illustrated herein. For example, it is contemplated that the deuterium containing catalyst compositions of the invention may be used in combination or with other polymerization catalysts including metallocene and Zieglar-Natta catalysts. For this reason, reference should be made solely to the appended of determining the true scope of the present invention.

We claim:

1. A catalyst system comprising a Group 15 atom containing bidentate or tridentate ligated metal catalyst compound wherein the metal atom is bound to at least one leaving group and to at least two Group 15 atoms, wherein at least one of the at least two Group 15 atoms is bound to a Group 15 or 16 atom through a bridging group, and wherein at least one Group 15 atom is bound to a deuterium atom or to a deuterium atom containing substituent.

2. The catalyst system of claim 1 wherein the catalyst compound is represented by the formulae:

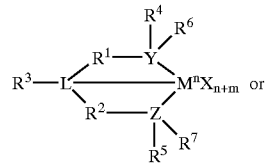

Formula (I)

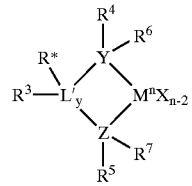

Formula (II)

wherein

M is a metal atom;

Each X is independently a leaving group;

y is 0 or 1;

n is the oxidation state of M;

m is the formal charge of the YZL ligand or the YZL' ligand;

L is a Group 15 or 16 element;

L' is a Group 15 or 16 element or Group 14 containing group;

Y is a Group 15 element;

Z is a Group 15 element;

$R^1$ and $R^2$ are independently a $C_1$ to $C_{20}$ hydrocarbon group, a heteroatom containing group having up to twenty carbon atoms, silicon, germanium, tin, lead, or phosphorus;

$R^3$ is absent, deuterium, hydrogen, a halogen, a hydrocarbyl group which may or may not contain one or more deuterium atoms, or a heteroatom containing group which may or may not contain one or more a deuterium atom(s);

$R^4$ and $R^5$ are independently an alkyl group, an aryl group, a substituted aryl group, a cyclic alkyl group, a substituted cyclic alkyl group, a cyclic arylalkyl group, a substituted cyclic arylalkyl group or multiple ring system wherein one or more hydrogen atom(s) contained in $R^4$ and $R^5$ are substituted with a deuterium atom;

$R^6$ and $R^7$ are independently absent, deuterium, hydrogen, an alkyl group, halogen, a heteroatom, or a hydrocarbyl group which may or may not contain one or more deuterium atoms;

R* is absent, deuterium, hydrogen, a Group 14 atom containing group, a halogen, or a heteroatom containing group.

3. The catalyst system of claim 2 wherein $R^1$ and $R^2$ are selected from the group consisting of a $C_1$ to $C_{20}$ hydrocarbon group, a heteroatom containing group, silicon, germanium, tin, lead, and phosphorus.

4. The catalyst system of claim 2 wherein $R^4$ and $R^5$ are each independently represented by the following formula:

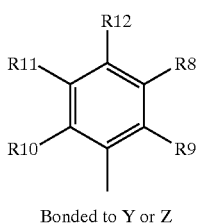

Formula (III)

Bonded to Y or Z

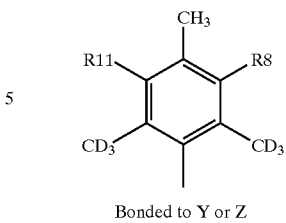

Bonded to Y or Z wherein $R^8$ to $R^{12}$ are each independently hydrogen, a deuterium atom, a deuterium atom containing group, a $C_1$ to $C_{40}$ alkyl group which may contain deuterium substituents, a halide, a heteroatom, a heteroatom containing group containing up to 40 carbon atoms.

5. The catalyst system of claim 4 wherein $R^9$, $R^{10}$ and $R^{12}$ are a deuterium substituted methyl, ethyl, propyl or butyl group.

6. The catalyst system of claim 4 wherein $R^9$, $R^{10}$ and $R^{12}$ are methyl groups containing one or more deuterium atoms, and $R^8$ and $R^{11}$ are hydrogen or deuterium.

7. The catalyst system of claim 4 wherein $R^4$ and $R^5$ are both a group represented by the following formula:

wherein R8 and R11 are deuterium or hydrogen.

8. The catalyst system of claim 2 wherein M is a Group 4 metal; L, Y, and Z are nitrogen; $R^1$ and $R^2$ is a hydrocarbyl group; $R^3$ is hydrogen or deuterium; $R^6$ and $R^7$ are absent; and $R^4$ and $R^5$ are independently an alkyl group, an aryl group, a substituted aryl group, a cyclic alkyl group, a substituted cyclic alkyl group, a cyclic arylalkyl group, a substituted cyclic arylalkyl group or multiple ring system wherein one or more hydrogen atom(s) contained in $R^4$ and $R^5$ are substituted with a deuterium atom.

9. The catalyst system of claim 2 wherein X is an aryl substituted alkyl group.

10. The catalyst system of claim 1 further comprising an activator and support a support.

* * * * *

UNITED STATES PATENT AND TRADEMARK OFFICE
CERTIFICATE OF CORRECTION

PATENT NO. : 6,624,107 B2
DATED : September 23, 2003
INVENTOR(S) : Wenzel et al.

It is certified that error appears in the above-identified patent and that said Letters Patent is hereby corrected as shown below:

Column 2,
Line 59, "know" should be deleted, and -- known -- inserted therefore.

Column 3,
Line 3, "catalysts" should be deleted, and -- catalyst -- inserted therefore.
Line 4, "system" should be deleted, and -- systems -- inserted therefore.
Line 10, "catalysts" should be deleted, and -- catalyst -- inserted therefore.
Line 20, "compound" should be deleted, and -- compounds -- inserted therefore.
Line 35, "carbon atoms, a heteroatom" should be deleted, and -- carbon atoms and a heteroatom -- inserted therefore.

Column 12,
Line 63, "substitute" should be deleted, and -- substituted -- inserted therefore.

Signed and Sealed this

Fourth Day of January, 2005

JON W. DUDAS
*Director of the United States Patent and Trademark Office*

UNITED STATES PATENT AND TRADEMARK OFFICE
Certificate

Patent No. 6,624,107 B2

Patented: September 23, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Timothy T. Wenzel, Charleston, WV (US); Thomas Henry Peterson, Charleston, WV (US); and David James Schreck, Lake City, MN (US).

Signed and Sealed this Sixth Day of February 2007.

DAVID W. WU
*Supervisory Patent Examiner*
Art Unit 1713